United States Patent
Chen

(10) Patent No.: US 11,183,866 B2
(45) Date of Patent: Nov. 23, 2021

(54) SYSTEM AND METHOD FOR SWITCHABLE MULTI-COIL WIRELESS INDUCTION CHARGING

(71) Applicant: CTOP Wireless Charging Solutions LLC, Vernon, CT (US)

(72) Inventor: Shuai Chen, Vernon, CT (US)

(73) Assignee: CTOP Wireless Charging Solutions LLC, Vernon, CT (US)

( * ) Notice: Subject to any disclaimer, the term of this patent is extended or adjusted under 35 U.S.C. 154(b) by 181 days.

(21) Appl. No.: 16/378,959

(22) Filed: Apr. 9, 2019

(65) Prior Publication Data

US 2019/0312452 A1     Oct. 10, 2019

Related U.S. Application Data

(60) Provisional application No. 62/654,735, filed on Apr. 9, 2018.

(51) Int. Cl.
| | | |
|---|---|---|
| *H02J 7/00* | (2006.01) |
| *H02J 7/02* | (2016.01) |
| *H02J 50/10* | (2016.01) |
| *H01F 38/14* | (2006.01) |

(52) U.S. Cl.
CPC ............. *H02J 7/025* (2013.01); *H01F 38/14* (2013.01); *H02J 50/10* (2016.02)

(58) Field of Classification Search
CPC .......... H02J 7/025; H02J 50/10; H02J 7/0042; H02J 7/00047; H02J 50/005; H02J 50/90; H02J 50/402; H01F 38/14
USPC ........................................................ 320/108
See application file for complete search history.

(56) References Cited

U.S. PATENT DOCUMENTS

| | | |
|---|---|---|
| 8,269,456 B2 | 9/2012 | Hui |
| 8,629,654 B2 | 1/2014 | Partovi et al. |
| 8,766,488 B2 | 7/2014 | Azancot et al. |
| 8,796,989 B2 | 8/2014 | Lee et al. |
| 9,337,666 B2 | 5/2016 | Low et al. |
| 9,601,933 B2 | 3/2017 | Graham |
| 9,608,475 B1 | 3/2017 | Karanikos et al. |
| 9,627,913 B2 | 4/2017 | Maugars |
| RE46,392 E | 5/2017 | Jung |
| 9,800,080 B2 | 10/2017 | Leabman et al. |
| 9,979,230 B2 | 5/2018 | Cook et al. |

(Continued)

FOREIGN PATENT DOCUMENTS

| | | |
|---|---|---|
| KR | 100877646 B1 | 1/2009 |
| KR | 20160082124 A | 7/2016 |

OTHER PUBLICATIONS

International Searching Authority, "International Search Report", PCT/US19/26474, dated Jul. 29, 2019.

*Primary Examiner* — Paul Dinh
(74) *Attorney, Agent, or Firm* — Intrinsic Law Corp.

(57) ABSTRACT

Aspects of this disclosure are directed to a charging pad or apparatus having multiple controllable charging source coils that can sense the proximity of a load coil through inductive coupling. The system and method operate charging source coils in a low-current sensing mode when no load is near, a high-current charging mode when a load is not near, or other modes. The system and method can wirelessly charge one or more loads (e.g., battery-powered devices) placed on or in proximity thereof and selectably control the power and magnetic field of the plurality of source charging coils.

6 Claims, 16 Drawing Sheets

(56) References Cited

U.S. PATENT DOCUMENTS

| | | |
|---|---|---|
| 2010/0328044 A1 | 12/2010 | Waffenschmidt et al. |
| 2014/0094116 A1 | 4/2014 | Walley et al. |
| 2015/0303699 A1 | 10/2015 | Wagman et al. |
| 2015/0311740 A1 | 10/2015 | Hilario et al. |
| 2017/0005527 A1 | 1/2017 | Ishihara |
| 2017/0237280 A1 | 8/2017 | Baarman et al. |
| 2018/0013310 A1 | 1/2018 | Moussaoui et al. |
| 2018/0212455 A1 | 7/2018 | Kasar et al. |
| 2019/0267828 A1* | 8/2019 | Goodchild .............. H02J 7/025 |

* cited by examiner

SYSTEM AND METHOD FOR SWITCHABLE MULTI-COIL WIRELESS INDUCTION CHARGING

RELATED APPLICATIONS

This application claims the benefit of and priority to U.S. Provisional Application No. 62/654,735, filed on Apr. 9, 2018, entitled "Device Charging Surface", which is incorporated by reference herein in its entirety.

TECHNICAL FIELD

This disclosure relates generally to the wireless charging of battery-powered loads using a system of induction coils in a charging pad or apparatus.

BACKGROUND

Wireless induction charging systems in the form of powered pads or surfaces are commercially available and used typically for charging small consumer devices such as mobile phones, tablets, smart watches and similar battery-powered devices. These wireless charging systems vary in their capacity (charging speed, load capacity) and cost.

FIG. 1 illustrates a basic concept of electromagnetic coupling and induction at 10 according to the known art, comprising a conductive coil or loop 100 in which a current "I" runs in relation to a magnetic field "B" as known to those skilled in the art. Conventionally, the direction of current flow and orientation of the corresponding magnetic field is given by the "right hand rule", which proscribes the (upwardly directed) polarity of magnetic field B in relation to the shown (counterclockwise) current flow I. The converse would be true (reversing the vector directions of the current and field lines), respectively. The current in loop 100 may be driven by an electromotive force (voltage supply) resulting in the magnetic field, or a driven magnetic field may conversely induce the flow of charge (current) within loop or coil 100.

In the case of inductive charging systems, a charging station has a power supply for driving a current in a conductive coil, we can refer to as a "source coil", which generates a corresponding magnetic field. A load, e.g., a device powered by a battery, also contains a conductive coil, we can refer to as a "load coil", which experiences said magnetic field and induces a current in the load coil that is used to charge the load device's battery using a charging circuit. One or more source and/or load coils may be employed in a given instance.

FIG. 2 illustrates a cross section of a simplified induction charging system 20 according to the prior art. A charging pad or inductive charging station 200 is typically disposed on a user's desk or other surface where a wireless battery-powered device (e.g., a mobile phone, tablet or other device 210) is to be charged.

An external electrical power supply or source 208 is provided to charging station 200. A transformer, power supply, or power management block 202 provides power to one or more source coils 204. The current in source coil 204 causes a magnetic field 206 that radiates outward from source coil 204, exponentially decreasing in strength with distance, as known to those skilled in the art.

Load device 210 contains a load coil 212, a power management module or battery charging circuit 214 and a battery 216. When device 210 is placed in proximity to charging pad 200 the magnetic field 206 induces a current in load coil 212, which is converted by charging circuit 214 into an electrical charging energy for charging battery 216. The effectiveness of system 20 depends on a number of physical and engineering factors including the design and power of the source-load charging and induction component, the proximity of the load to the source, and the geometry and relative placement of the source and load coils. U.S. Pat. No. 8,629,654 is directed to a multi-coil charging system.

Existing systems have performance and form factor limitations and are often compatible with certain manufacturer products. Also, existing systems are also able to effectively charge a load placed in a specific place on the surface of the charging pad, for example at a marked center location on the charging pad, due to the placement of the induction coils in the charging pad. All or most conventional inductive charging systems have a coil that provides the magnetic field to power a load coil and device. These systems typically proscribe a very specific position for placement of the load device or coil to be charged thereon. For example, a load device must be centered on or carefully placed in the middle of the charging pad for the induction field to be sufficiently effective to charge the device. Placement off-center or outside of the proscribed charging area of the pad results in slow or ineffective results. Furthermore, existing systems are not configurable or scalable to charging a variety or quantity of battery-powered loads. The present disclosure addresses these and other limitations of conventional wireless induction charging systems.

SUMMARY

This disclosure relates generally to the wireless charging of battery-powered loads using a system of induction coils in a charging pad or apparatus.

One or more embodiments are directed to an inductive charging system comprising a source coil array comprising a plurality of source coils, each source coil having one or more conductive windings supporting a current flow therein and causing an inductive magnetic field thereof; a sensor array comprising a plurality of current sensors configured and arranged to sense a current in one or more source coils coupled to said current sensor, each current sensor further being addressably indexed so that a given source coil can be identified by one or more current sensors coupled thereto; and a switching array comprising a plurality of switches coupled to respective source coils so as to determine a respective magnitude and orientation of an electrical driving signal provided to each of said respective source coils.

Some embodiments are directed to a method of inductive charging of a load comprising detecting a presence of a nearby load coil at a subset of source coils in a multi-source coil charging array; for the subset of source coils detected to be proximal to said load coil, switching said subset of source coils from a first mode of operation to a first mode of operation, the second mode of operation being characterized in that it provides a higher magnetic field along a charging mode orientation or polarity; and for any source coils not among said subset of source coils detected to be proximal to the load coil, operating said non-proximal source coils in the first mode of operation, said first mode of operation being characterized in that it provides a lower magnetic field in a second opposing orientation or polarity than that of the charging mode orientation Further embodiments are directed to an inductive charging system comprising an inductive charging pad containing a plurality of inductive charging source coils, each controllably operated in at least two modes of operation: a first sensing or low power mode and a second charging or high power mode, at least the source coils operating in said charging mode providing an inductive magnetic field for charging a load coil; a load coil proxy containing one or more inductive load coils configured and arranged to generate an electrical power output responsive to said indictive magnetic field; and a conducting connector coupling said load coil proxy and inductive coil(s) to an electrical charging receptacle of a load that does not contain an inductive charging load coil so as to deliver the electrical power output of the load coil proxy to a charging system of said load device.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

As stated, improvements in inductive charging systems are desirable and many limitations exist in current systems and methods. The following exemplary or preferred embodiments illustrate the nature, construction and operation of the instant invention. Those skilled in the art will understand upon review of this disclosure that the illustrated embodiments can be generalized and extended to many other situations which are comprehended by the present invention and claims.

Figure 1:
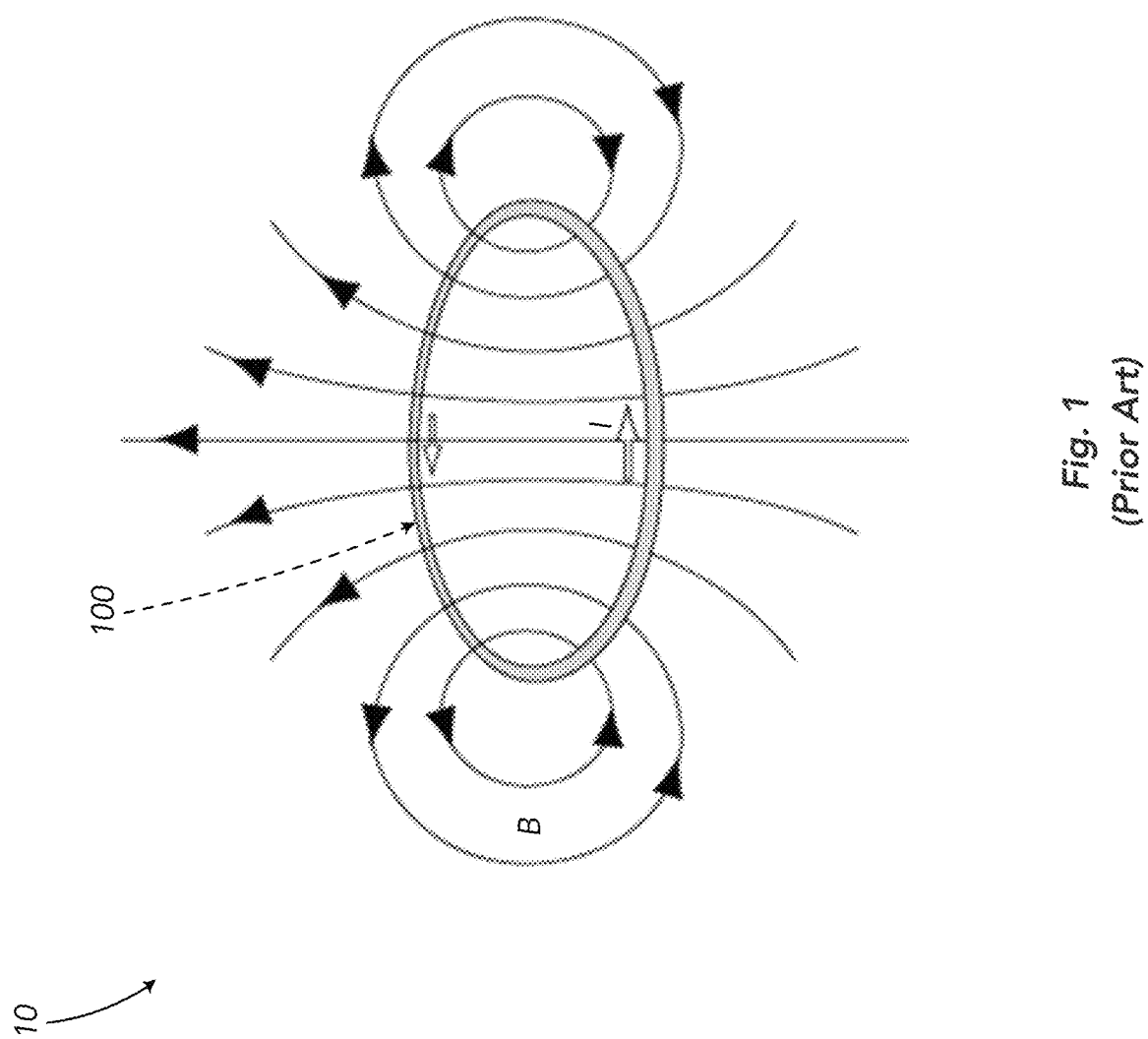
FIG. 1 illustrates a basic concept of electromagnetic coupling and induction.
Figure 2:
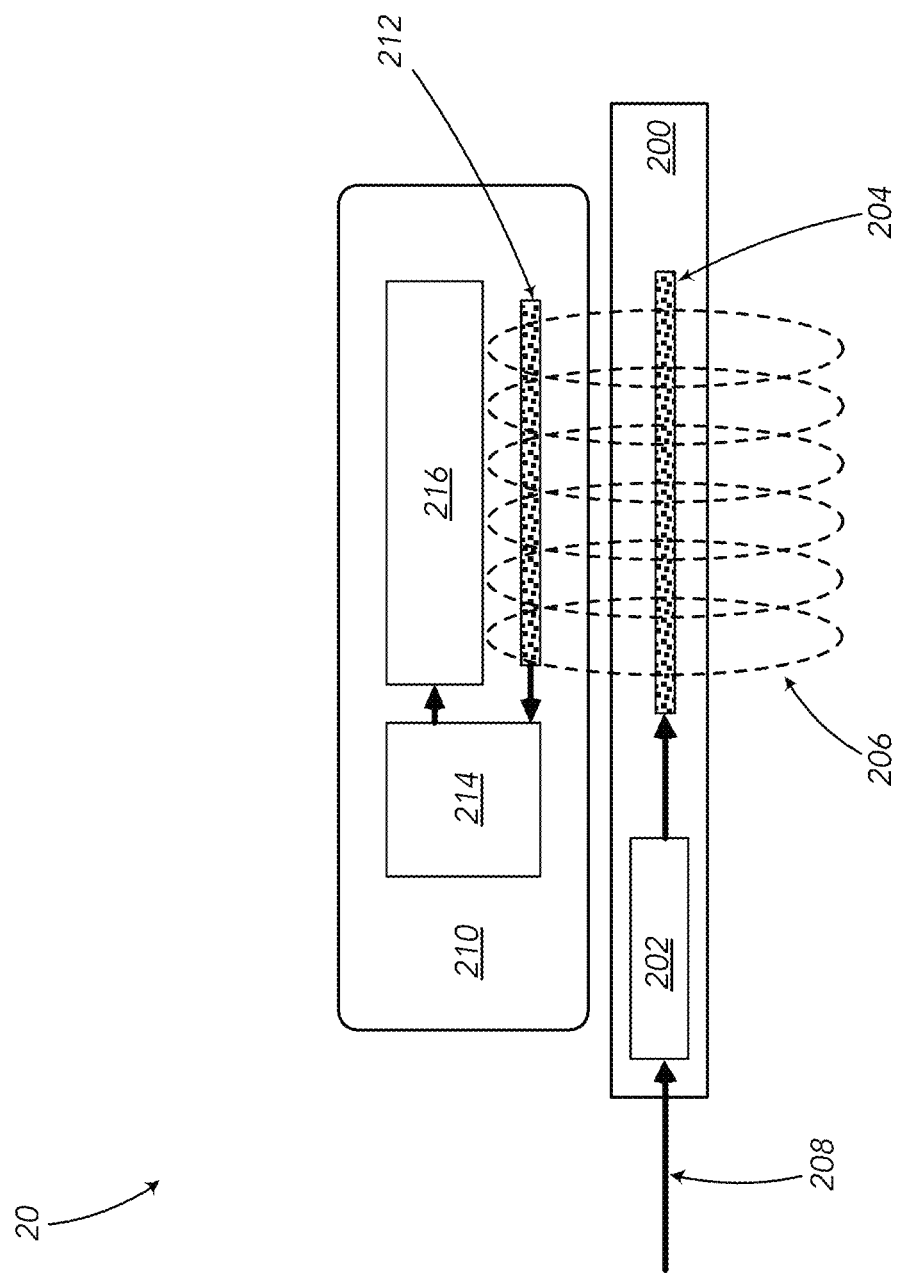
FIG. 2 illustrates a cross section of a simplified induction charging system.
Figure 3:
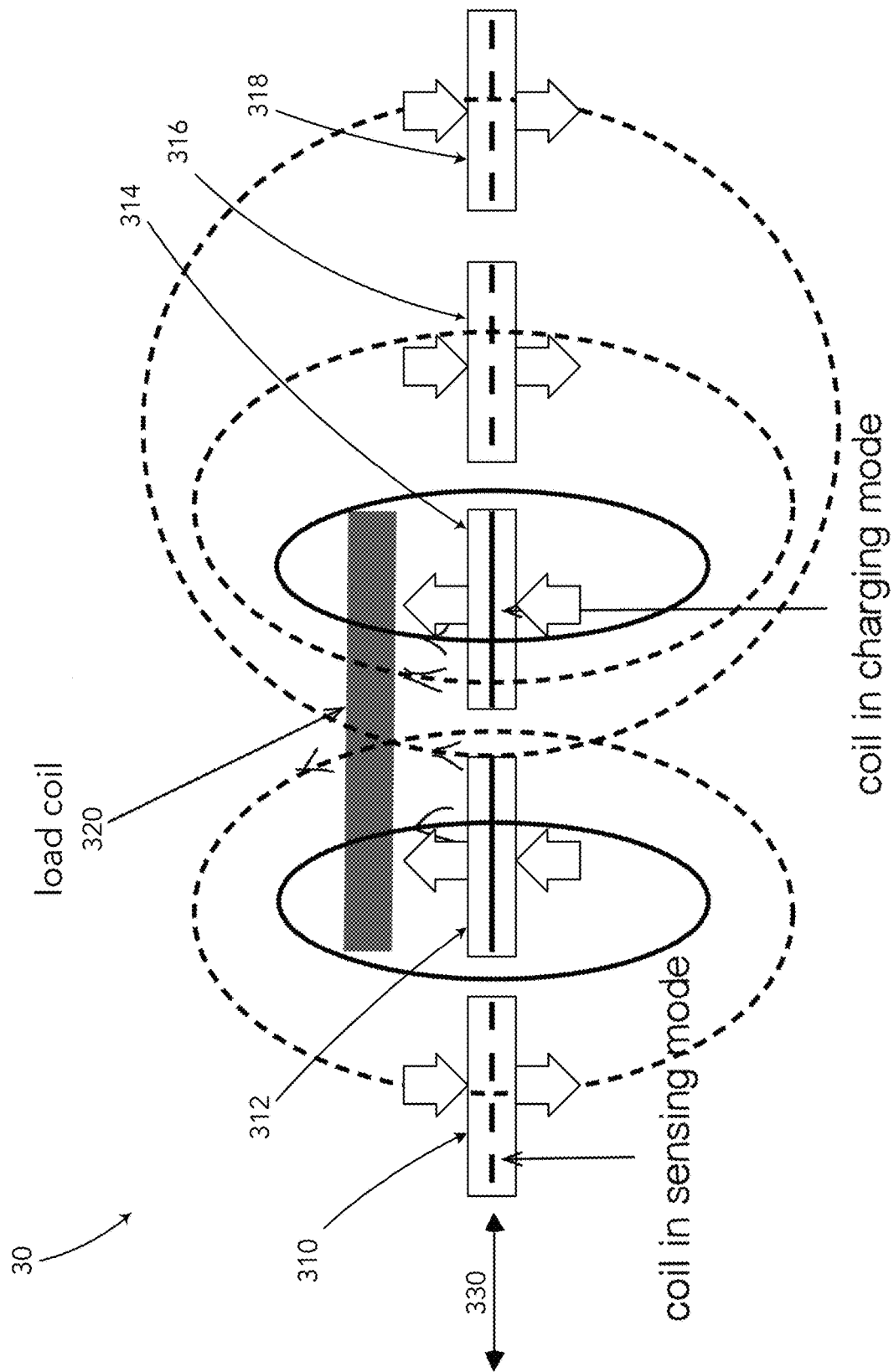
FIG. 3 illustrates a cross section of the source and load coils of an induction charging system.

FIG. 3 illustrates a cross section of the source and load coils of an induction charging system and load according to an embodiment 30. In the present embodiments, a plurality of source coils is employed in an indictive charging system or pad. The plurality of source coils is controlled as described below. The source coils may have open areas in a number of geometric shapes (in plan view) including hexagonal shapes as will be illustrated below. The source coils may be arranged in a co-planar arrangement (e.g. in plane 330) or substantially co-planar arrangement. While the present embodiment illustrates one such source coil plane in cross-section, the present invention includes embodiments having multiple source coil planes where each source coil plane is substantially parallel to the others. The load coil 320 may be parallel to the source coil plane(s) and may be above, below, beside, or between one or more such source coil planes.

A plurality of wound source coils 310, 312, 314, 316 and 318 lie in a plane 330 of an inductive charging system, pad or platform. Each source coil (310, 312, 314, 316, 318) is provided with a driving electrical signal (e.g., a driving current) in its windings so as to generate a magnetic field corresponding thereto. As known to those skilled in the art, the magnetic field of each source coil is a space-varying vector field providing a magnetic flux defined by physical and design parameters of the driven source coil. The overall magnetic field in the space surrounding the source coil(s) is a spatially-dependent vector field representing the superposition of each coil and other magnetic field source in the environment.

One or more load coils 320 in a load device is placed in proximity with the source coils. The magnetic field generated by the source coils causes an induced electrical output (e.g., current) from load coil 320 that can be transformed, amplified, filtered or otherwise conditioned by a charging circuit (not shown) in the load device to energize/charge a load battery (not shown).

In an aspect, the present system and method comprehends controlling and operating the source coils to be in one of a plurality of operating modes or states. One such mode or state is called a "charging mode" in which the source coil is driven (1) at a greater source coil current to achieve a greater magnitude output field from the source coils in charging mode, and (2) in a proscribed polarity or current direction so as to cause the magnetic field from the source coil(s) in charging mode to be directed in a given direction (upwards from their center in the illustrated example). A second mode or state of operation is referred to as a "sensing mode" of the source coil. Source coils 310, 316 and 318 in the present example are being driven in sensing mode. In sensing mode, the source coil(s) are (1) driven at a lower source coil current to achieve a lesser magnitude magnetic field, and (2) in a reversed polarity or current direction so as to cause a magnetic current oppositely-oriented than the source coils in charging mode. The reason for this will be explained below, as will several other modes of operation and advantages thereof.

Quantitatively, the electrical driving of the source coils depends on their design and on the application in which they are used. For example, if large, medium or small load devices are being charged, the source coils and overall inductive charging system can be driven with relatively high, medium or low source voltage. In one non-limiting example, a modest load such as a mobile communication device (phone, tablet or similar load) could be charged using a 10-20 VAC source for coils in "charging mode", and using a 1-2 VAC source for coils in "sensing mode." These values are exemplary and are not provided by way of limitation as those skilled in the art will understand that many factors can be used to select the various voltages for driving source coils in their various operating modes. Larger loads such as electric appliances, electric tools, electric bicycles, electric cars or other relatively large loads are generally driven at higher source voltages and currents. Therefore, this invention is not limited to charging smaller load devices such as mobile phones and tablets, but can also be extended to greater size and power loads such as home appliances, television sets, and other apparatuses powered by rechargeable batteries. In addition, the invention can be used to generally operate as a power source, for example to directly supply electrical power to an electrical load, whether or not driven by battery power.

In the present example, we can see that the source coils (312, 314) lying substantially under, proximal to or nearest to the load coil 320 are in charging mode; while the source coils (310, 316, 318) not as proximal to, or laterally further from, load coil 320 are operated in sensing mode. In one result, this arrangement allows an efficient use of energy by the source coils so that the source coils nearest to the load are driven with greater energy while those further from the load are driven and lower energy, thereby saving overall energy use by the charging system. In another result, we can see from the cross-sectional illustration above that the overall field applied to load coil 320 is maximized by the opposite orientation of the magnetic fields caused by the charging mode source coils (312, 314) and the sensing mode source coils (310, 316, 318), whereby all coils (charging and sensing modes) are contributing to a same-orientation cumulative magnetic field going into load coil 320 (all directed upwardly through the load coil 320 in the shown example).

Figure 4:
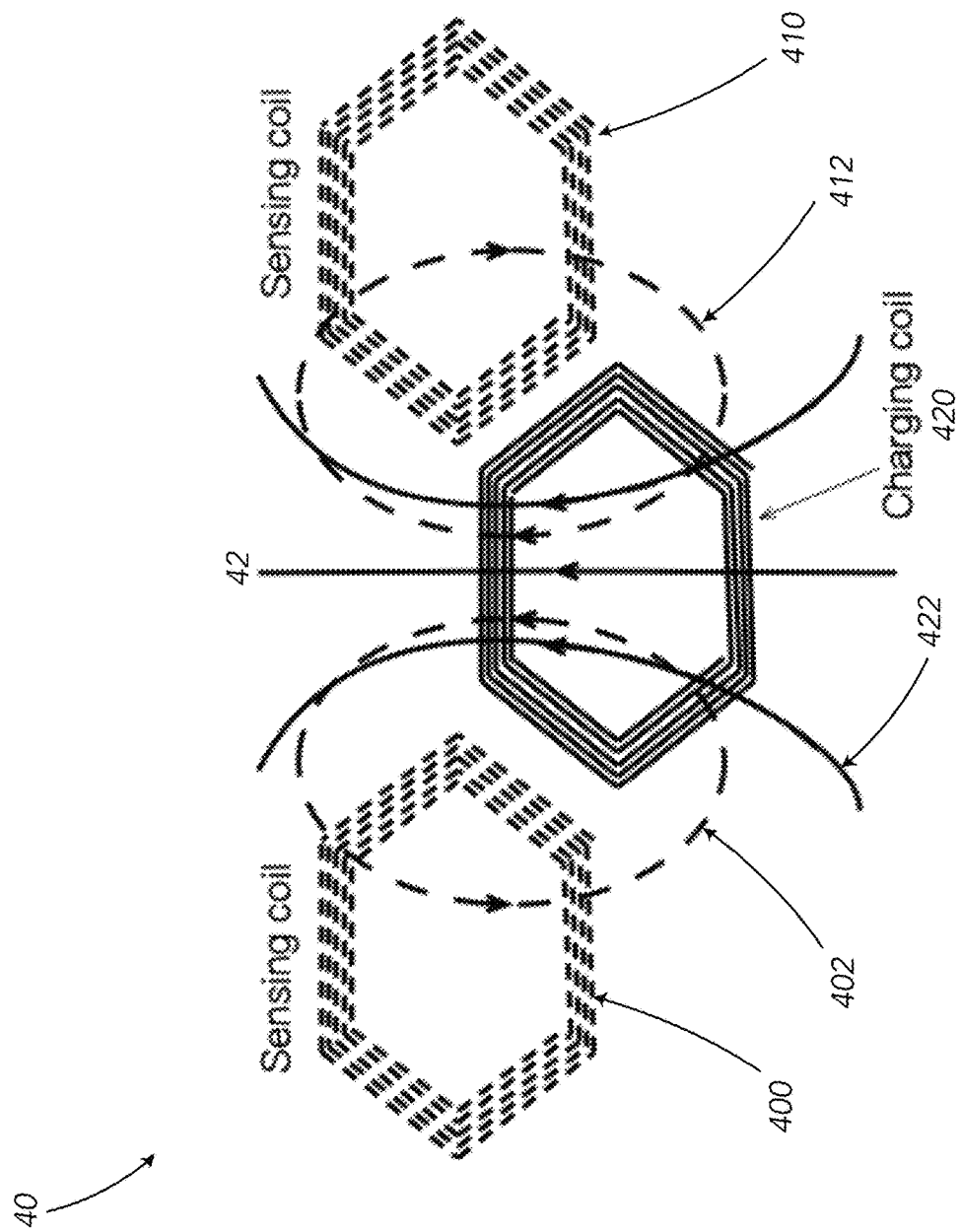
FIG. 4 illustrates a perspective view of an inductive charging surface or pad with several source coils.

FIG. 4 illustrates a perspective view 40 of a plurality of source coils 400, 410, 420, each comprising several conductive windings. The individual windings are substantially hexagonal in plan view/in the source coil plane. Two of the coils 400 and 410 are operated in a sensing mode, driven with clockwise source currents, resulting in respective magnetic fields 402 and 412, having a downwardly-pointing polarity at the centers thereof. By contrast, source coil 420 is driven in the reversed orientation or polarity, with a counter-clockwise source current, and results in a magnetic field 422 that is upwardly pointed at the center of source coil 420. We can see that this technique causes an overall or cumulative magnetic field at and near the center of coil 420 to be in the same general polarization direction (upwardly in this example). This is one benefit of running the present induction charging system with multiple operational modes, some of which are oppositely-driven to achieve the desired alignment of the overall magnetic field lines or flux in target regions.

In an aspect, having hexagonal shaped windings and coils as shown provides certain advantages in the present context, which will be quantified and explained in more detail below. Briefly, the hexagonal coils of the present system provide for desirable tiling or packing of the adjacent coils in the plane of the source coil system or charging pad. The overall tiled arrangement in the source coil plane can appear honeycomb like in some embodiments. Also, certain dimensional relationships in the hexagonal coil design improve the effectiveness of the present systems as will be discussed in more detail herein. However, it should be appreciated that some embodiments of the invention are not limited to hexagonal shaped coils, but can use for example coils having a circular, elliptical, square, pentagonal, octagonal, or other multi-sided winding shapes.

In operation, a system for inductive wireless charging is provided that comprises a plurality of source coils in a generally flat or planar configuration, sometimes (but not necessarily) lying in a plane such as the plane of a flat charging pad. The source coils are normally in a monitoring or sensing mode as described above, with a minimal current flowing therein such as in a standby or low-power mode. When a user places a load containing a load coil therein near the charging pad, the source coils in the charging pad can detect the presence of the load and its load coil through mutual inductance between the source and load coils. At a given constant voltage, source coils excited by the magnetic field of a nearby load coil will experience increased current flow.

Figure 5:
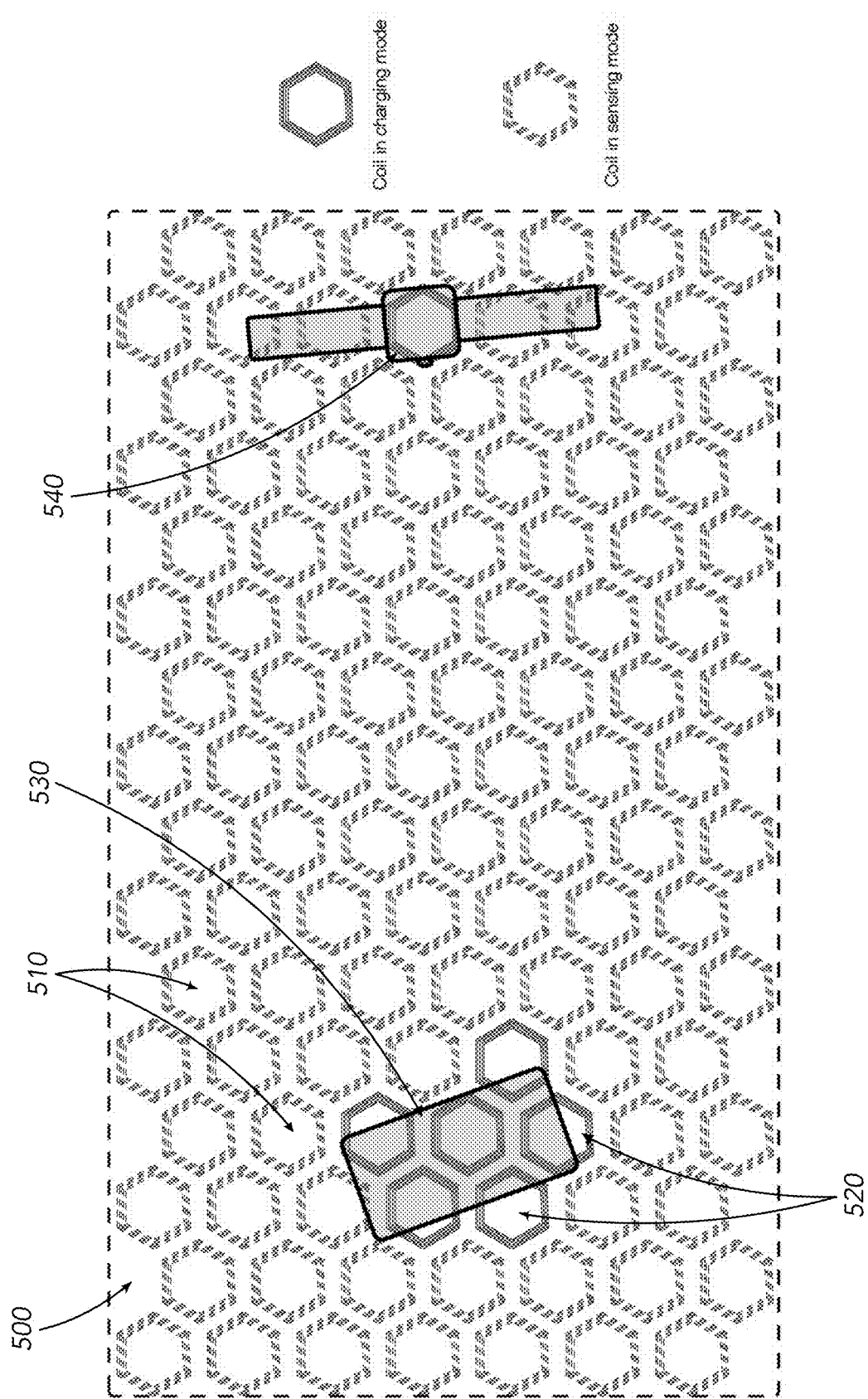
FIG. 5 illustrates a plan (top) view of an induction charging pad or surface for charging one or more load devices.

FIG. 5 illustrates a plan (top) view of an induction charging pad or surface 500 for charging one or more load devices 530, 540. The inductive charging surface 500 comprises a plurality of hexagonal coils (having one or more conductive windings describing a substantially hexagonal current path). When the load devices 530, 540 are placed on top of or in proximity to the surface 500 the electromagnetic coupling between the source coils in the pad and the load coil(s) in the devices causes an increased current in the proximal source coils near or immediately under the devices. As will be explained below, the source coils are addressable and individually identifiable and controllable by a source coil control circuit. As will be shown in more detail, a source coil may be identified or addressed by its row and column location in a group of source coils arranged. This allows a controller or processor circuit coupled to the source coils to identify the general position of one or more load devices on account of the natural increase in the source coils proximal to the load devices and inductively coupled thereto.

In the example shown, a first load device such as a mobile phone 530 and a second load device such as a smart watch 540 are placed on inductive charging pad 500. This causes certain source coils to experience an increase in current at a constant voltage. So under the present method, the system can be operated to monitor or sense for the placement of load devices/coils thereon, determine the general location (proximal source coils) in order to selectively activate or energize said proximal source coils to put them into charging mode.

As can be seen, the charging pad or surface 500 may include many arrayed source coils 510. The source coils can be relatively small in size relative to the overall pad size. Therefore, unlike conventional inductive chargers that have a main source coil the load needs to be placed on (e.g., centered on), this and other present embodiments allow for placement of the load device on substantially any portion of the charging pad, mat or surface 500. This is convenient because a user does not have to carefully align the load device on a specific position to be charged, rather, the user can more casually place his or her device on the charging mat, pad or surface 500 and it will be above one or more coils 510, 520, which will effectively charge the device 530. Furthermore, if the device is moved or bumped it will still be charged effectively as its exact position on the surface 500 is not as critical as with other existing charging systems.

Figure 6:
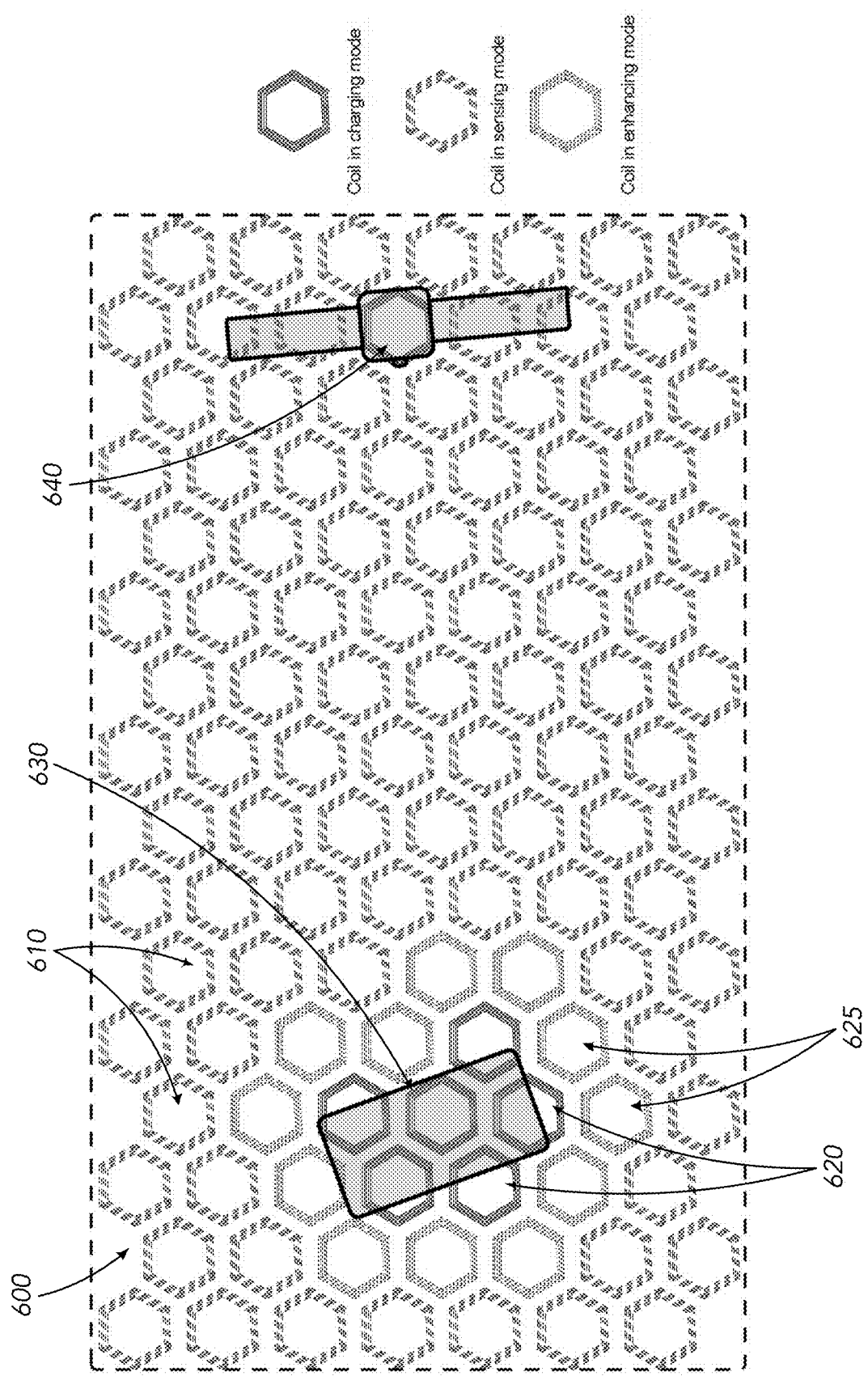
FIG. 6 illustrates another example of a plan view of a wireless inductive charging pad or surface.

FIG. 6 illustrates another example of a plan view of a wireless inductive charging pad or surface. The charging surface 600 comprises a plurality of source coils, normally in a first low-power or sensing state as described. However, in this embodiment, an additional operational state we refer to as "enhancing mode" is defined whereby some source coils are used in an intermediate power mode to assist in charging the loads and whereby the enhancing mode source coils 625 operate at greater current and power capacity than the standby or sensing mode coils 610 but less current and power than the charging mode source coils 620. The exemplary embodiment shown illustrates how the enhancing mode source coils 625 are generally closer to the load devices than the sensing mode coils 610 but further from the loads than the charging coils 620. Those skilled in the art will understand that a variety of ways are available for defining which source coils can be operated in which mode, as a power management unit or controller is coupled to and can addressably and selectably determine the mode of operation of any given source coil. In one non-limiting example, the source coils directly beneath the load devices or load coils can be operated in highest-power/current mode (charging mode), the source coils not directly beneath the loads but nearest to the loads can be defined as enhancing source coils having an intermediate power/current applied, and the other source coils further away from the loads are operated in the lowest power/current mode as sensing mode or standby source coils. The designer of a given system can determine an appropriate power/current/voltage to apply to the source coils in each operating mode, which can be in part decided by the nature and size of the loads being charged. It should also be understood that other intermediate modes of operation can be defined without loss of generality. For example, two, three, four, or more modes of operation each having respective levels of charging power/current and/or voltage can be designated and defined as suits a given application.

In an aspect, source coils directly beneath or most proximal to the load (charging mode coils) have a given current flow orientation and magnetic field polarity, while other source coils (e.g., enhancing mode, sensing mode, etc.) have the opposite current flow orientation and magnetic field polarity. Again, this is to enhance the overall magnetic field flux and vector field strength in the region of the load coil for best charging capability.

Figure 7:
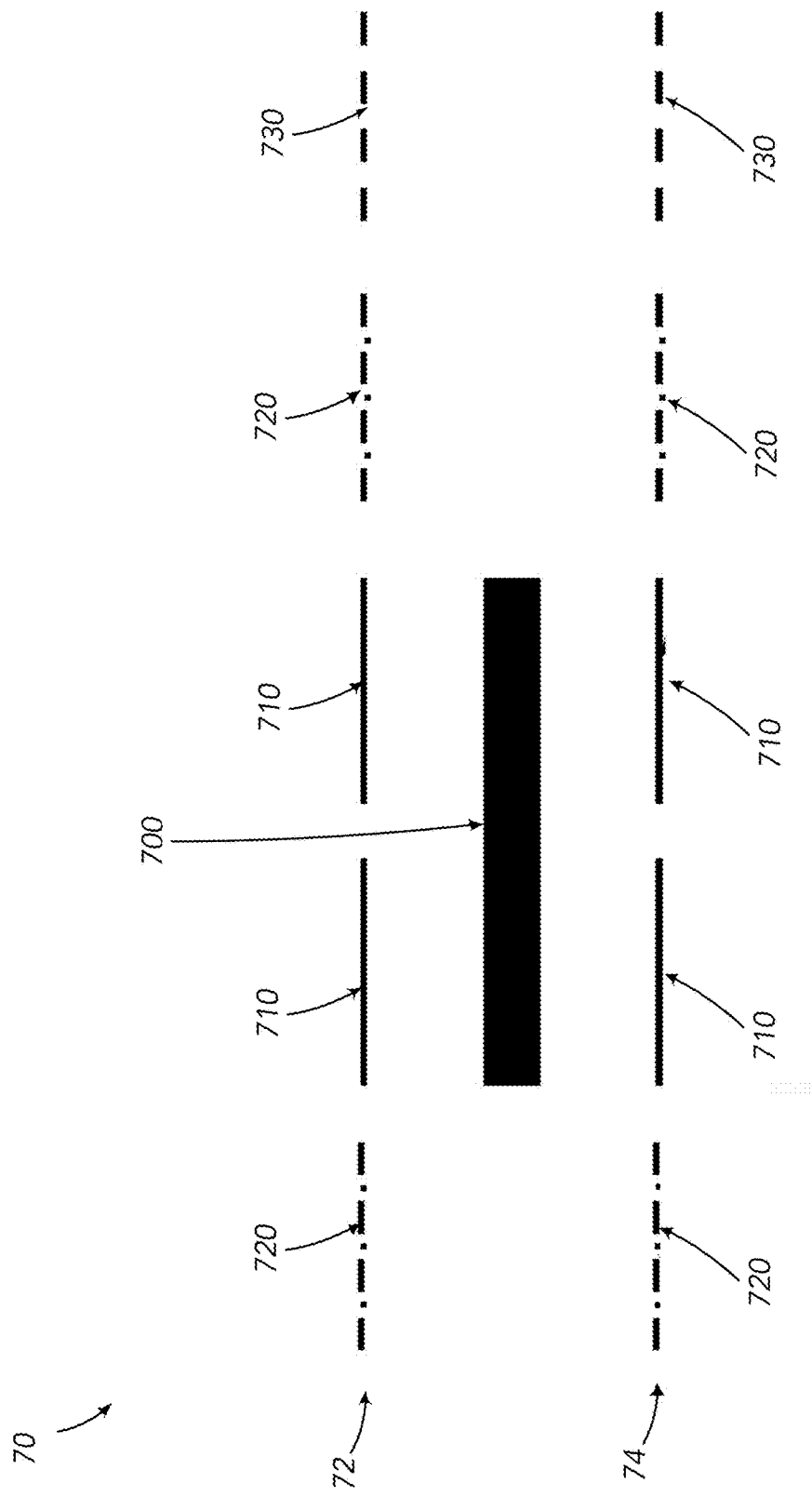
FIG. 7 illustrates a cross section of an inductive charging system applied to a load or load coil.

FIG. 7 illustrates a cross section of an inductive charging system 70 applied to a load or load coil 700 being charged thereby. In this example, two charging surfaces 72 and 74 are provided, which are generally planar and lie generally parallel to one another. The multi-plane inductive charging surfaces 72, 74 can be placed on the same side as load 700 or can sandwich load 700 (one on either side of the load) as shown in the non-limiting example. Those skilled in the art will understand that more source coil planes can be added as well without loss of generality.

The example shows simplified cross-sections of the source coils 710 (operating in charging mode), 720 (operating in enhancing mode), and 730 (operating in sensing mode). As mentioned before, the charging mode source coils are providing a magnetic field at a higher amplitude and in a first polarity while the enhancing and sensing mode source coils are providing a magnetic field at an intermediate and lower amplitude, and in a second (opposed) polarity.

Figure 8:
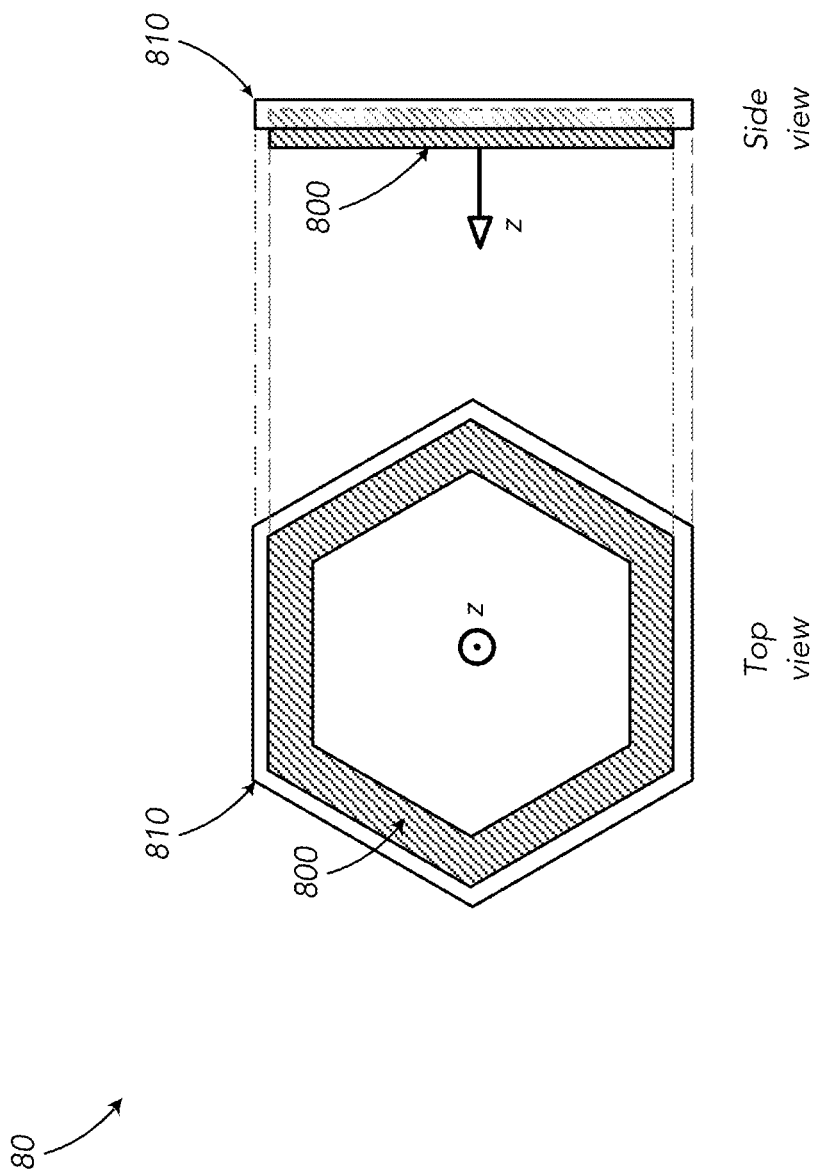
FIG. 8 illustrates an exemplary source coil and housing.

FIG. 8 illustrates an exemplary source coil and housing according to an embodiment 80. A source coil 800 may be hexagonal shaped as described earlier, but may also be a differently-shaped, e.g., circular, elliptical, or other multi-sided shape. The source coil 800 is disposed in a housing 810, which may be made of an electromagnetically-reflective or conductive material such as a conductive metal. The housing 810 acts in operation to reflect and alter the shape of the magnetic field of the source coil 800. In an aspect, the placement of the source coil 800 in a pan, cup or tray-shaped housing 810 may enhance or increase the magnitude of the projected magnetic field along a direction "z" orthogonal to the face of the source coil 800. This can be useful in an optional embodiment for increasing the effective magnetic field of the source coils towards a direction of a load. For example, if the source coils 800 are lying in a plane of a charging pad or surface as described above, and the loads are intended for placement on top of the charging pad or surface, the use of underlayment beneath one or more coils such as a source coil housing 810 can amplify the effect of the source coils to accelerate the charging process or to reduce the power/current needed to operate the inductive charging system.

Figure 9:
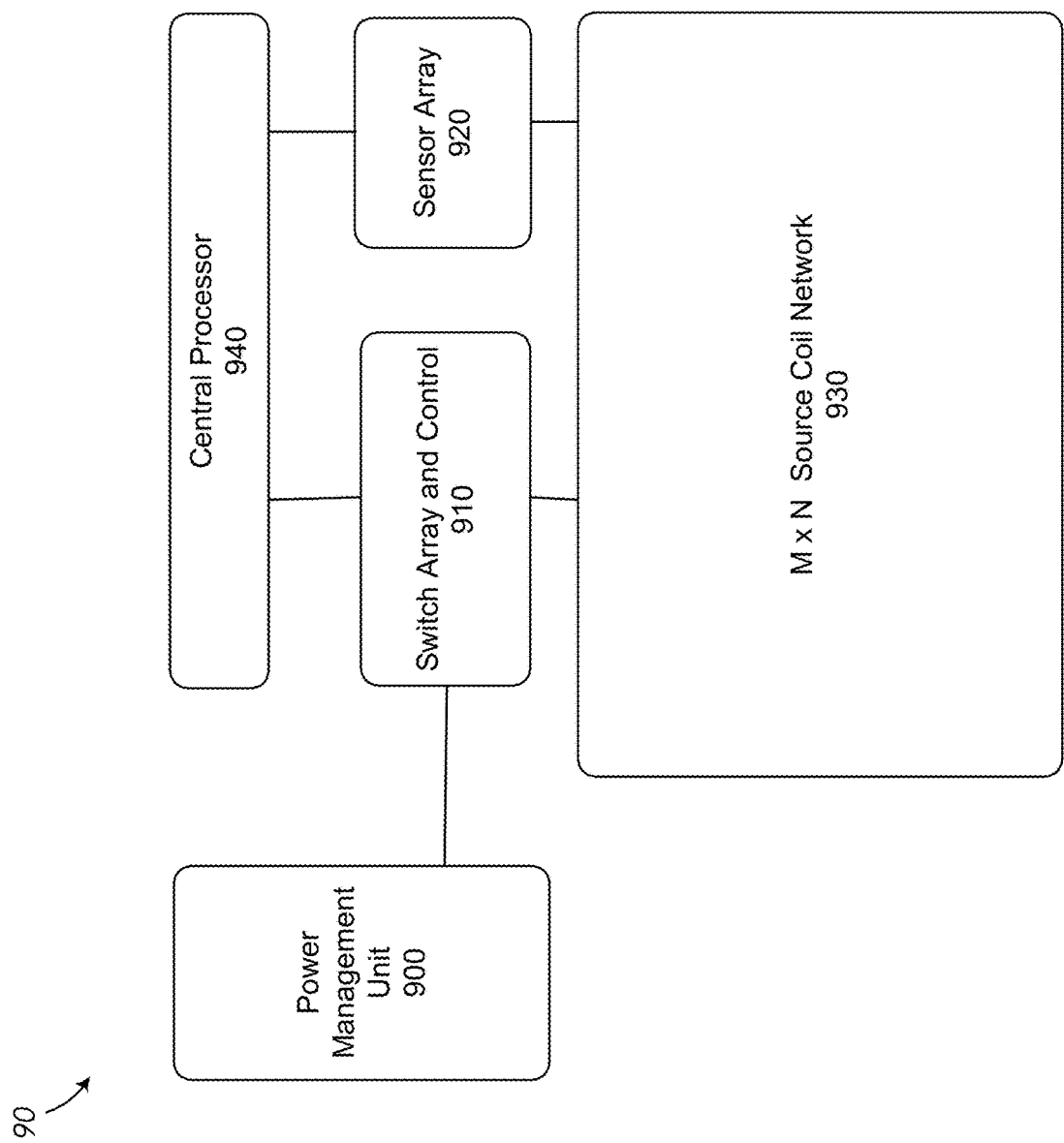
FIG. 9 illustrates a system 90 for inductive charging and control of a multi-source coil array or network.

FIG. 9 illustrates a system 90 for inductive charging and control of a multi-source coil array or network 930 of source coils as described herein. A Power management unit, module, circuit or system 900 provides electrical driving power to operate the system. In some embodiments, a drive or source voltage is set (which may depend on the size and nature of the charging application and load). The power from the power management unit 900 is delivered to the individual source coils in the source coil network 930 by an array, bank, or arrangement of switches in switch array and control unit 910. Power management unit 900 may comprise AC to DC converters, filters, transformers, or other electrical power conditioning components. The system 90 is able to selectably deliver a desired electrical driving/power signal to any source coil in the source coil 930 by way of switch array and control unit 910. As described above, each source coil may be connected to a respective sensor that senses a condition relating to said source coil. Also, as will be discussed below, each row and each column of a grid or array of source coils may be coupled to a respective row and column sensor. The system 90 is able to identify a particular source coil by its corresponding row and column location, i.e., the source coils are addressable and can be selectively and programmably controlled and individually operated. A central processor 940 is further coupled to the other components in some aspects to provide a higher level programming and control function to the overall system 90. In some cases, central processor 940 supports the execution of an operating system or higher-level functions such as data processing, user interface and other functions. Central processor 940 may be equipped with modules or interfaces for communication, data storage or other computing modules and interfaces.

Figure 10:
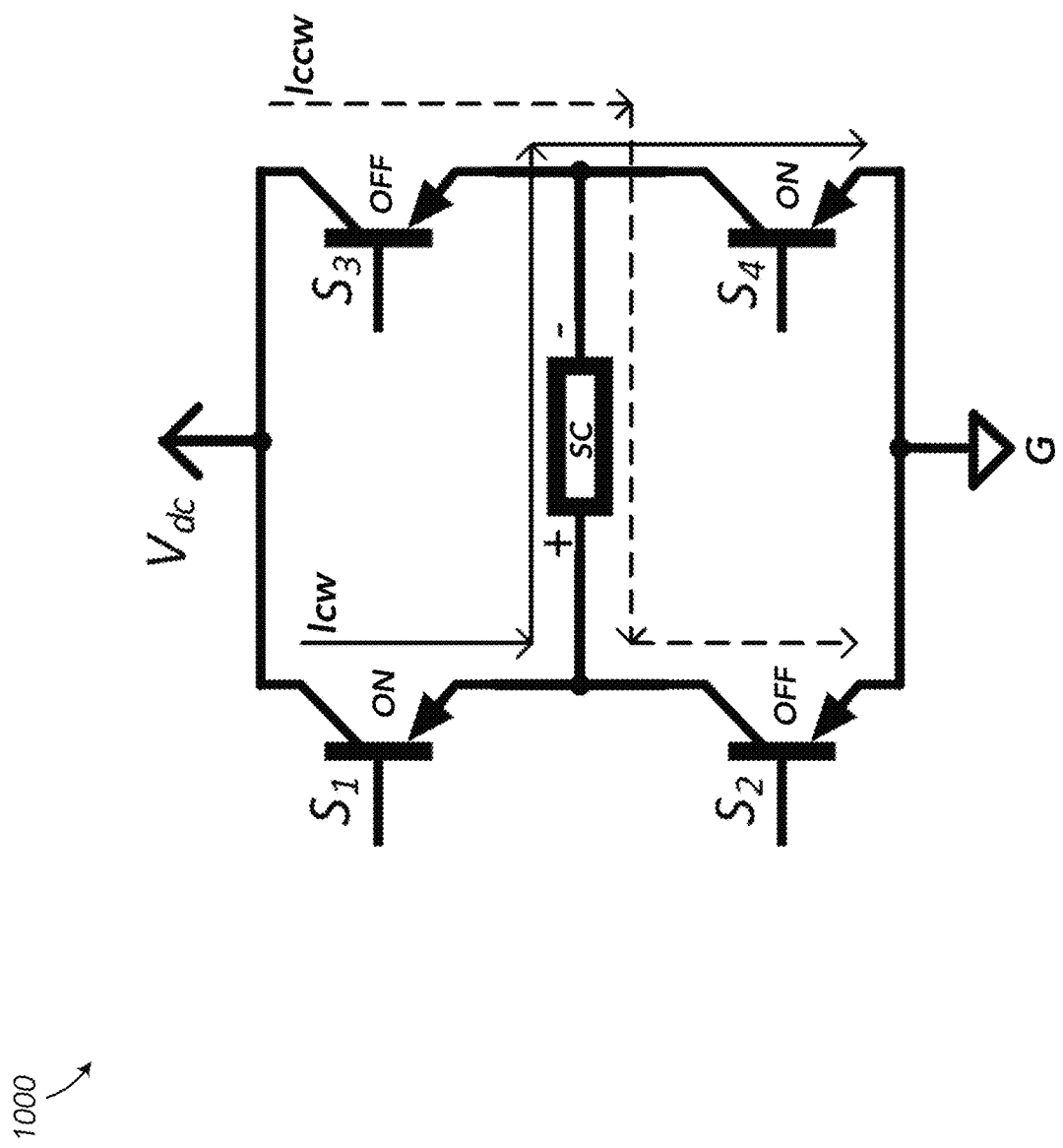
FIG. 10 illustrates an exemplary coil control circuit for controllably delivering power to one or more source coils.

FIG. 10 illustrates an exemplary but non-limiting coil control circuit for controllably delivering power to one or more source coils. A driving source voltage Vdc is determined and set by an input electrical voltage source (which may be down-converted, transformed, filtered, or derived through an AC to DC converter). The circuit 1000 in certain configurations operates in a way determined by the switches (e.g., transistors) S1 through S4 to pass a current, through a source coil SC, from source voltage Vdc down to ground G.

The illustrated circuit shows the two modes or states of operation of circuit 1000: a first state of the circuit being when switches S1 and S4 and closed (ON/conducting current) and switches S2 and S3 are open (OFF/not conducting current). In this first state, current Icw flows from Vdc through S1 then the source coil SC then switch S4 to ground G. In an example, Icw of this first state means that current flows clockwise through the windings of a given source coil SC. In a second state, switches S3 and S2 may be ON and switches S1 and S4 may be OFF, which would result in a reversed current Iccw flowing through the source coil SC. Thus, we can control the direction or orientation or polarity of the magnetic field from a given source coil SC by controlling its corresponding power switching circuit 1000.

The switching can effectively toggle one or more (e.g., a subset) of source coils so as to change their power source or electrical connections from a first voltage source line to a second voltage source line.

Figure 11:
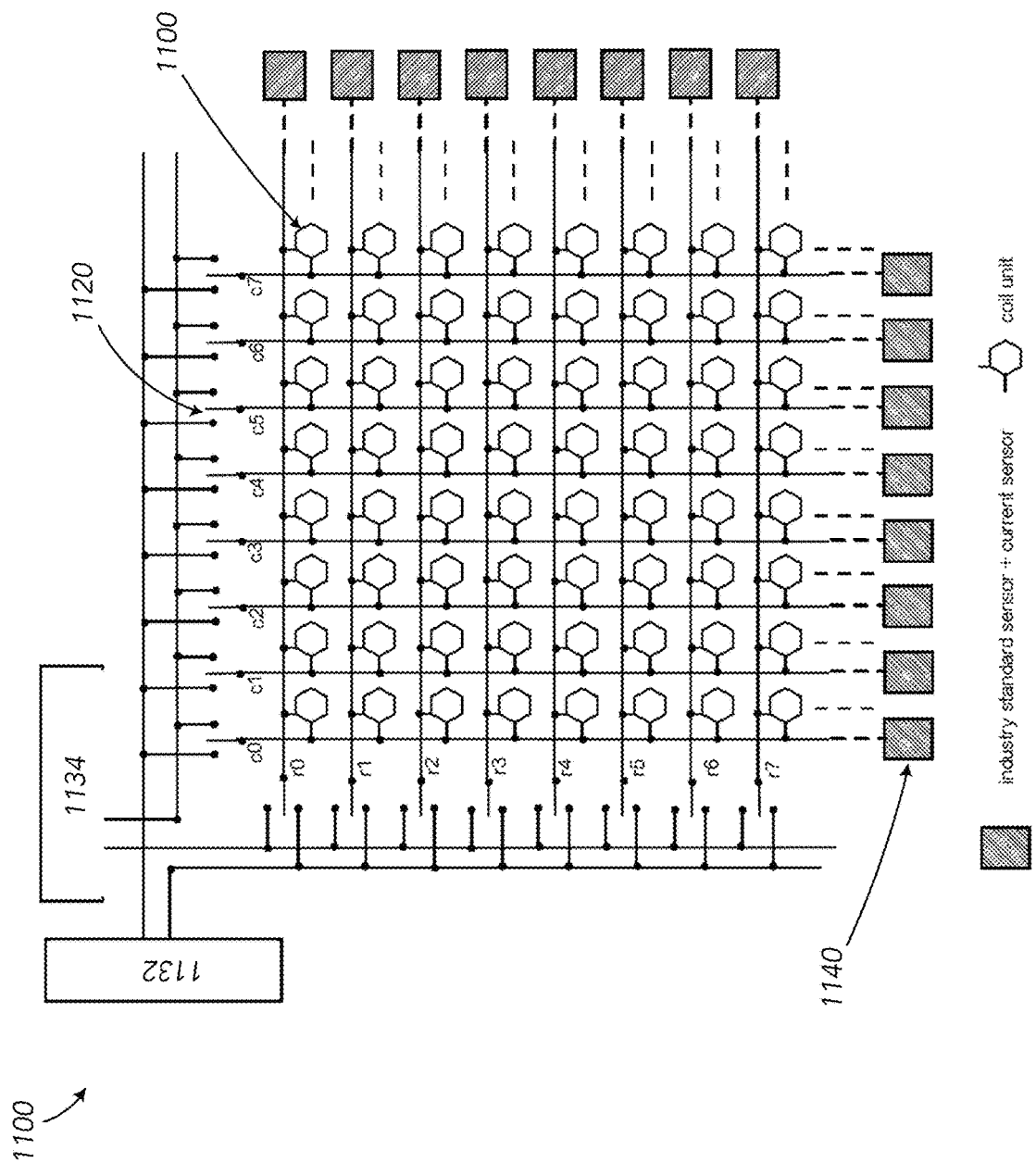
FIG. 11 illustrates an exemplary arrangement of an inductive charging system circuit.

FIG. 11 illustrates an exemplary arrangement of an inductive charging system circuit 1100. The system includes a network of source coils 1110 arranged in rows (r0, r1, r2, . . . ) and columns (c0, c1, c2, . . . ). A given source coil can be addressed or referred to by its column and row association (e.g., the $i^{th}$ row and $j^{th}$ column) in a M×N network or array or grid of source coils 1100.

Switching circuits 1120 (represented here as a plurality of switches 1120 coupled to each source coil) determine whether and how each respective source coil is powered. The source coils 1100 can receive controllable driving power signals from a plurality of power conversion circuits 1132 and 1134. For example, power conversion circuit 1132 may supply a low-power sensing mode driving signal while power conversion circuit 1134 may supply a high-power charging mode driving signal, depending on the mode of operation of each coil 1100. The switching can be accomplished using controllable transistor switches to apply and/or reverse a supply driving signal to each source coil 1100. It is to be understood that a third, or fourth, or more states of the source coils can be defined and supported as described herein, and that a corresponding number of electrical drive signals. For example, a third power conversion circuit can supply an intermediate voltage, current or driving electrical signal to a corresponding array of switches to power some or all of the source coils in an intermediate power operating mode (such as an "enhancing" mode of operation).

Sensing of the state or condition or row/column of a specific source coil can be accomplished using a suitable sensor (or array of such sensors) 1140 coupled to the source coils 1100. The sensors 1140 may be of an industry standard type, for example but not limited to Qi type sensors.

Figure 12:
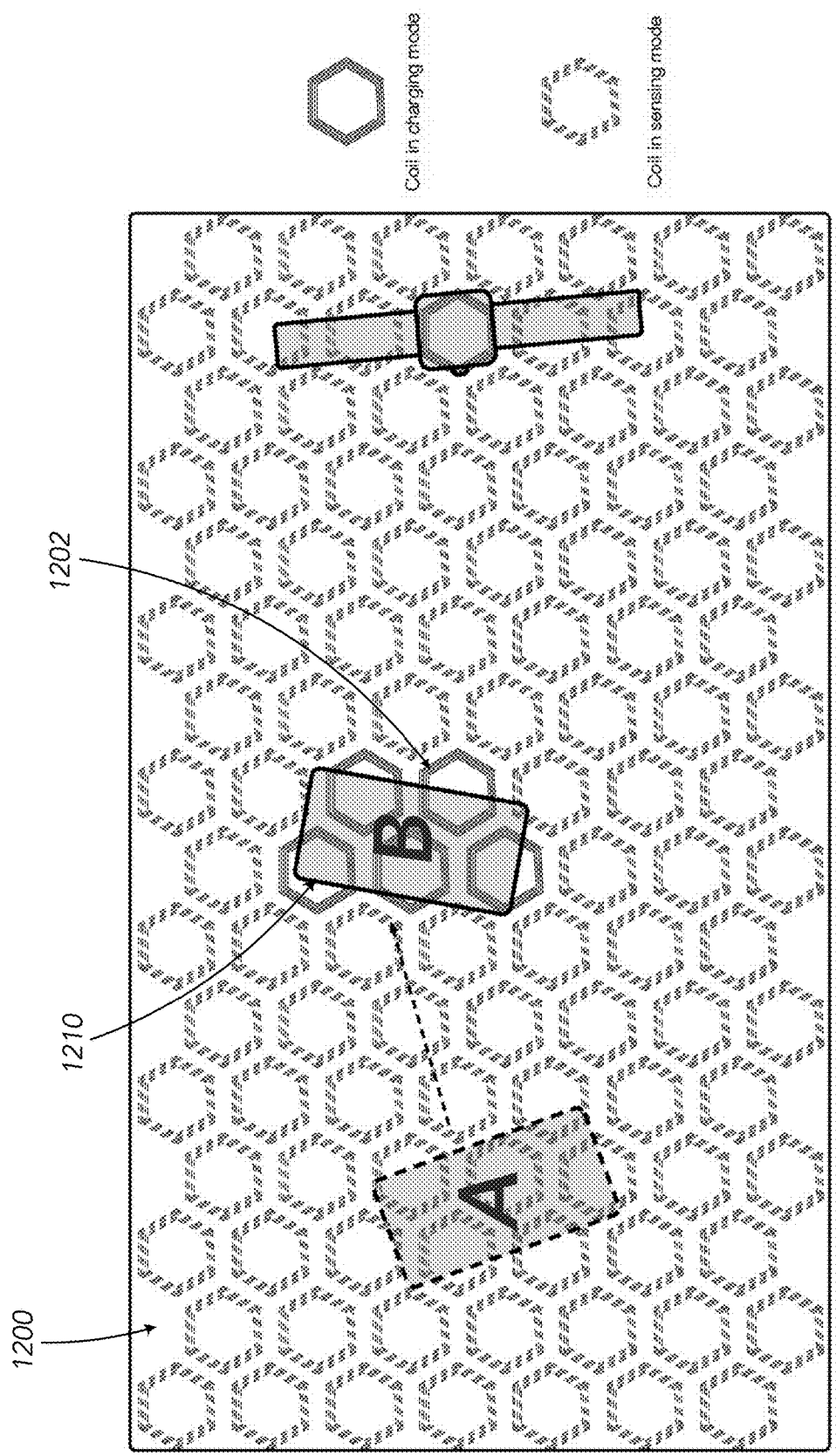
FIG. 12 illustrates how a wireless load device and its position can be sensed on a multi-sensing coil charging surface.

FIG. 12 illustrates how a wireless load device 1210 and its position can be sensed on a multi-sensing coil charging surface 1200. As described earlier, the mutual inductance or magnetic field coupling between the load coil(s) and proximal nearby source coil(s) causes an increase in current in the affected source coils, which can be detected by sensors 1140 shown above. If load 1210 is moved from a first position "A" on charging surface 1200 to a second position "B" on charging surface 1200, this can be detected, registered and accounted for by the present charging systems and methods. The set of source coil(s) 1202 operating in "charging" mode can dynamically change as the position of a load on the surface of charging pad 1200 is changed.

We have mentioned that a charging system or surface according to this invention may comprise a plurality of source coils wound in a geometric shape, including but not limited to a hexagonal shape. We also noted that said shape or profile of the face of the source coil may vary according to design constraints, applications, or other practical implementation requirements.

Figure 13:
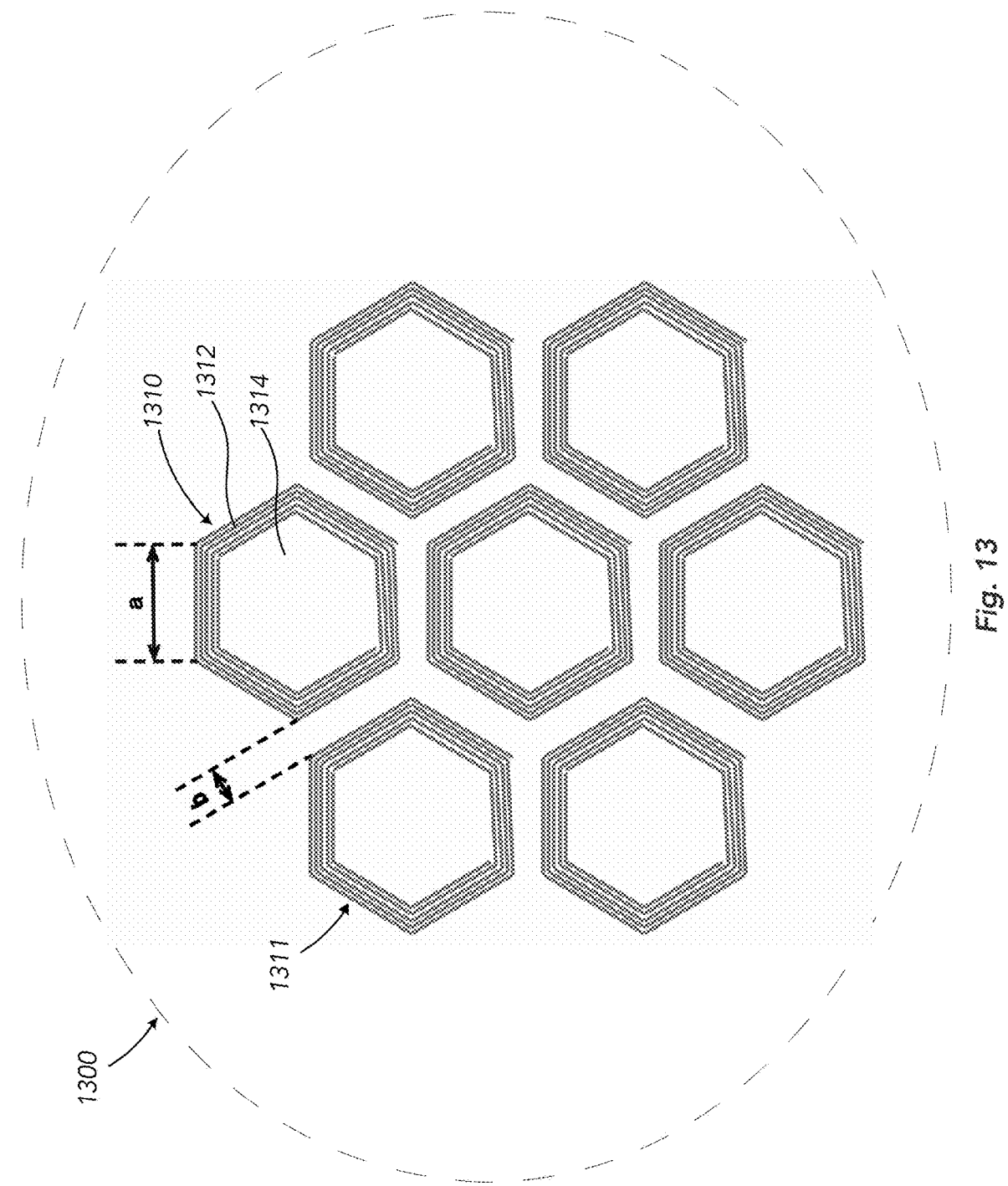
FIG. 13 illustrates an exemplary top view of a portion of an inductive charging surface having several tiled source coils.

FIG. 13 illustrates an exemplary top view of a portion of an inductive charging surface 1300 having several tiled source coils 1310. The arrangement shown is one of several possible embodiments but can suffice for illustrating some further features of aspects of the invention. For example, the hexagonal source coil 1310 typically comprises a plurality of individual conductor loops or windings 1312. The wound conductor windings 1312 define an open interior space 1314. As stated, driving electrical current will flow around the coil windings and create a corresponding magnetic field output. The field achievable, and the electrical characteristics of the system and its performance are determined, in part, by the dimensions and geometry and other physical properties of the windings 1310. The overall geometric performance of the system 1300 is a function, in part, of the size of the source coil 1310 and its hexagonal side dimension "a" as well as the distance or separation or gap "b" between one coil 1310 and another coil 1311.

Figure 14:
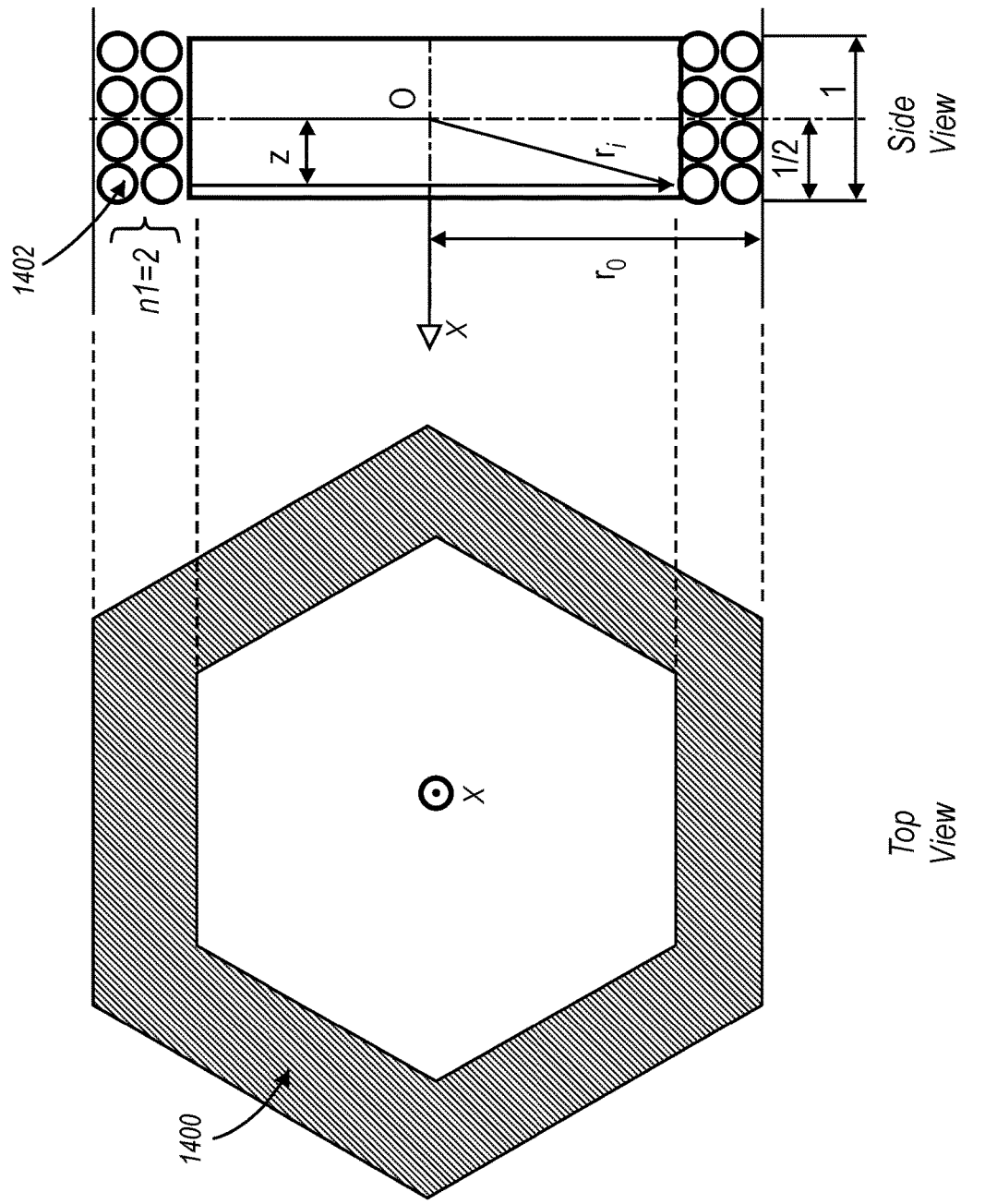
FIG. 14 illustrates a top and a side cross-sectional view of an exemplary source coil.

FIG. 14 illustrates a top and a side cross-sectional view of an exemplary source coil 1400 according to one embodiment. The coil is positioned in a plane orthogonal to the x-axis as shown. The coil comprises a plurality of windings 1402. The simple illustrated coil is shown to have two windings in a layer of adjacent windings parallel to the open face of the coil, and four windings deep (i.e., four layers of windings in the coil) for a total of eight windings in the coil 1400. As shown, $n_1=2$ denotes the number of windings per unit length radially along the face of a coil, $n_2=4$ denotes the number of windings per unit length along the depth or thickness of the coil. The coil 1400 thus has a finite lateral extent defined by an effective outer radial dimension $r_0$ and an effective inner radial dimension $r_i$ (measured diagonally from the origin O). The stacked windings 1402 in the thickness dimension have a total extent I as shown, and z is the distance between a given winding and the center plane of the coil through origin O.

Accordingly, the magnetic field of a source coil in an induction charging system is:

$$B0_z = \frac{1}{2}\mu_0 n_1 n_2 I \left( \left(\frac{1}{2}+z\right) \ln \frac{r_0 + \sqrt{r_0^2 + \left(\frac{1}{2}+z\right)^2}}{r_1 + \sqrt{r_1^2 + \left(\frac{1}{2}+z\right)^2}} + \left(\frac{1}{2}-z\right) \ln \frac{r_0 + \sqrt{r_0^2 + \left(\frac{1}{2}-z\right)^2}}{r_1 + \sqrt{r_1^2 + \left(\frac{1}{2}-z\right)^2}} \right)$$

$$B_a(r,z) = B0_z - \frac{B0_z^{(2)}}{2^2}r^2 + \frac{B0_z^{(4)}}{2^2 4^2}r^4 + \ldots + (-1)^n \frac{B0_z^{(2n)}}{\prod_{m=1}^{n}(2m)^2} r^{2n} + \ldots$$

Where $B_z$ denotes the magnetic field along the x-axis, $n_1$ denotes the number of windings per unit length radially along the face of a coil, $n_2$ denotes the number of windings per unit length along the depth or thickness of the coil. I is the current in the windings of the source coil.

Referring to the prior figures in which a coil dimension "a" and separation distance between coils is "b" the inventors have recognized a useful design sizing and arrangement of the multiple induction coils to achieve desired inductive charging performance. In some aspects, the dimension "a" of a coil is chosen as a function of the dimension "I" of the smallest device charged and the sensitivity coefficient a as $a=\alpha*I$. In some aspects, the dimension separating one coil from an adjacent coil is "b" and is chosen as a function of the mutual inductance factor β and the field strength B as $b=\beta*B_z^2$. In the case of hexagonal-shaped coils and windings, "a" may be the dimension of one of the sides of the hexagon and "b" may be the distance separating one hexagonal coil and the next as illustrated above. Those skilled in the art can understand that this technique can be modified to apply to non-hexagonal shaped coils without loss of generality.

Figure 15:
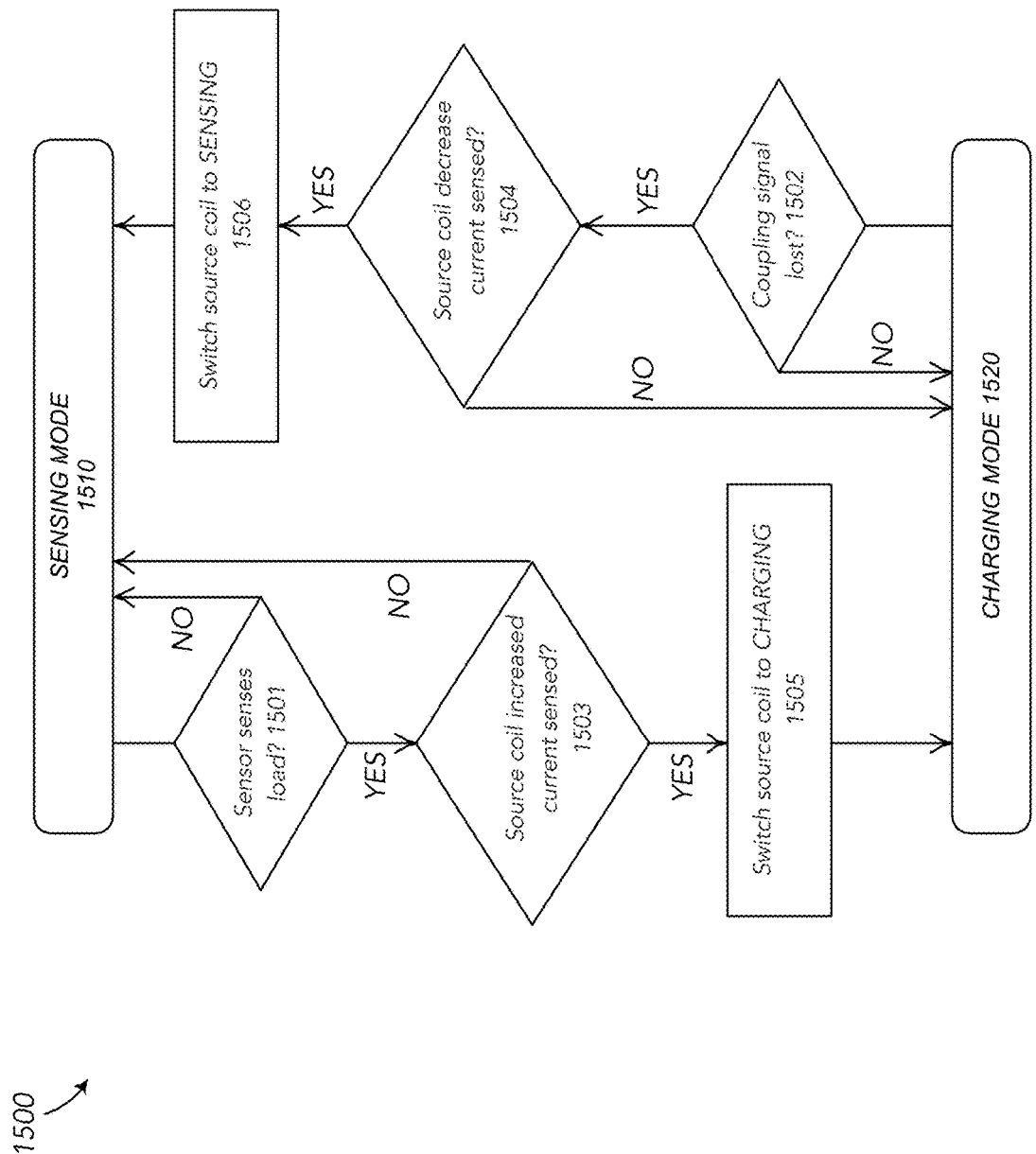
FIG. 15 illustrates an exemplary method for operating and selectably switching a given source coil.

FIG. 15 illustrates an exemplary method for operating and selectably switching a given source coil in a source coil array or network between two states or modes of operation, for example, between a first (Sensing) mode 1510 and a second (Charging) mode 1520. At 1501 a sensor in a sensor array described earlier (e.g., Qi based industry standard sensors or other sensors) senses the proximity of a load coil that in part causes an inductive coupling to alter the current in the sensor coil. Once an increased source coil current is noted at 1503 that source coil is switched to a second (Charging) mode at 1505 using the switching array and controller described herein. The source coil is taken from a Charging mode 1520 to the Sensing mode 1510 if the inductive magnetic field coupling between the source and load coils is lost at 1502, and a resulting source coil current is reduced at 1504. This would switch the source coil to Sensing mode at 1506.

Figure 16:
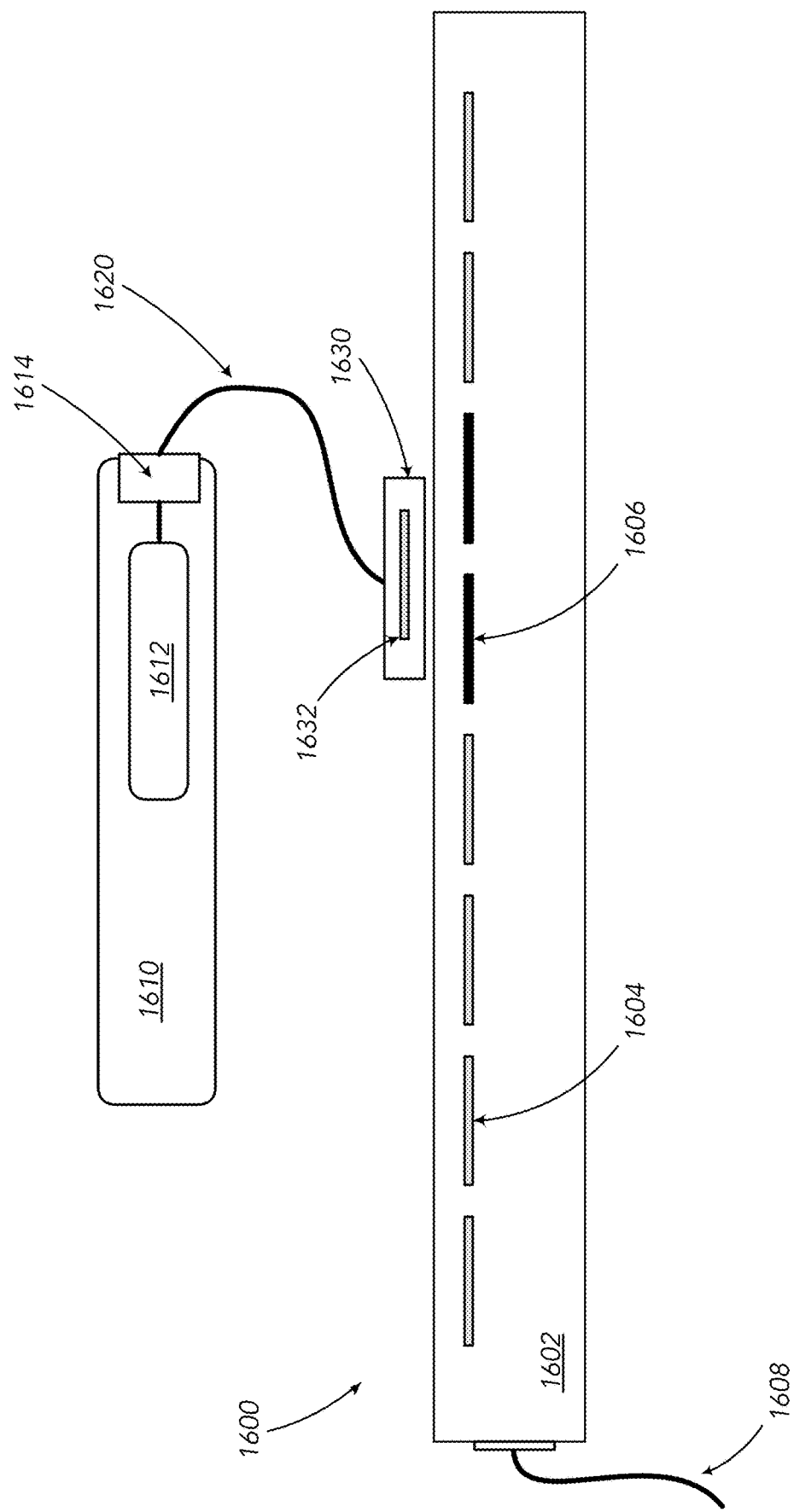
FIG. 16 illustrates the use of a load coil proxy in an inductive charging system.

FIG. 16 illustrates the use of a load coil proxy in an inductive charging system 1600 consistent with the above description. Here, we have a multi-coil source of inductive field charging 1600 as before comprising a plurality of source coils 1604, 1606, etc. The charging system may be in the form of a pad, platform, bed or surface 1602 as suits a given application. The charging system 1600 may be powered by an electrical input 1608, e.g., from ordinary service electrical AC receptacles, optionally using transformers, rectifiers, filters or other means to condition the input power to a required level as described earlier and for use by the power management units of the invention.

The load 1610 in this example is a battery-powered device that has a rechargeable battery 1612 receiving its charging power from a connector, plug, or other load power supply interface 1614. Various DC power input plugs or connectors are used in various consumer products familiar to those skilled in the art, such as those used to couple a mobile phone, tablet, computing device or other apparatus to a charging cable 1620. In this embodiment the device 1610 is not equipped with an integral inductive charging load coil. For example, older mobile phones and user products do not always support inductive wireless charging. The device 1610 and its battery 1612 are herein able to be charged using inductive charging system 1600 using a load coil proxy 1630 (sometimes in the form factor of a so-called "dongle") the load coil proxy 1630 does include one or more inductive charging load coils 1632, which interact with the source coils 1604, 1606 as stated earlier. Once the load coil 1632 is inductively coupled with proximal source coils 1606 these source coils are switched to a higher power (charging) mode of operation as described. The non-proximal source coils 1604 remain in low power or standby (sensing) mode. The magnetic field of the charging surface 1602 and its source coils energizes the load coil 1632 in load coil proxy (dongle) 1632, which carries the resulting current generated through charging cable 1620 to charging port or connector 1614 so as to charge battery 1612. In this way, we can use the load coil proxy 1630 to inductively charge an unlimited variety of devices 1610 that on their own would not have the built-in support for inductive wireless charging.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program," "software," and "app" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present disclosure should therefore not be considered limited to the particular embodiments described above. Various modifications, equivalent processes, as well as numerous structures to which the present disclosure may be applicable, will be readily apparent to those skilled in the art to which the present disclosure is directed upon review thereof.

The invention claimed is:

1. An inductive charging system comprising:
a source coil array comprising a plurality of source coils, each source coil having one or more conductive windings supporting a current flow therein and causing an inductive magnetic field;
a sensor array comprising a plurality of current sensors configured and arranged to sense a current in one or more source coils coupled to said current sensor, each current sensor further being addressably indexed so that a given source coil can be identified by one or more current sensors coupled to the given source coil; and
a switching array comprising a plurality of switches coupled to respective source coils so as to determine a respective magnitude and orientation of an electrical driving signal provided to each of said respective source coils;
the system configured and arranged to sense a proximity of a load coil placed near a subset of said source coils, the proximity of the load coil causing an inductive coupling between said load coil and proximal source coils, and further causing an increase in electric current in the proximal source coils;
said proximal source coils and said switching array being configured and arranged to deliver said electrical driving signal at a first magnitude and orientation to the proximal source coils while delivering said electrical driving signal at a second magnitude and a reversed orientation to any source coils other than said proximal source coils.

2. The system of claim 1, further comprising a processing unit that executes machine-readable instructions and controls at least said switching array.

3. The system of claim 1, wherein said source coils and windings are hexagonal shaped and arranged substantially in a planar configuration to tile a charging surface with the plurality of said source coils.

4. The system of claim 3, wherein said source coils are arranged in a honeycomb configuration and have a defined size and spacing.

5. The system of claim 1, said proximal source coils and switching array being configured and arranged to switch a mode of operation of said proximal source coils so as to increase the electrical driving signal only to said proximal source coils, thus placing only the proximal source coils into a charging mode of operation.

6. An inductive charging system comprising:
a source coil array comprising a plurality of source coils, each source coil having one or more conductive windings supporting a current flow therein and causing an inductive magnetic field;
a sensor array comprising a plurality of current sensors configured and arranged to sense a current in one or more source coils coupled to said current sensor, each current sensor further being addressably indexed so that a given source coil can be identified by one or more current sensors coupled to the given source coil; and
a switching array comprising a plurality of switches coupled to respective source coils so as to determine a respective magnitude and orientation of an electrical driving signal provided to each of said respective source coils;
said plurality of source coils comprising at least two subsets of source coils: a first subset operating in a first mode of operation for charging a load at a higher induced magnetic field strength and a first orientation, and a second subset of source coils operating in a second mode of operation at a lower induced magnetic field strength and a second orientation opposite to the first orientation.

* * * * *